(12) United States Patent
Holzweber et al.

(10) Patent No.: US 9,366,236 B2
(45) Date of Patent: Jun. 14, 2016

(54) TESTING AN OVERSPEED PROTECTION SYSTEM OF A WIND TURBINE

(75) Inventors: Paul Holzweber, Hamburg (DE); Claus T. S. Andreasen, Beder (DK)

(73) Assignee: Vestas Wind Systems A/S, Aarhus N. (DK)

( * ) Notice: Subject to any disclaimer, the term of this patent is extended or adjusted under 35 U.S.C. 154(b) by 351 days.

(21) Appl. No.: 13/979,612

(22) PCT Filed: Jan. 10, 2012

(86) PCT No.: PCT/DK2012/050011
§ 371 (c)(1),
(2), (4) Date: Oct. 1, 2013

(87) PCT Pub. No.: WO2012/095111
PCT Pub. Date: Jul. 19, 2012

(65) Prior Publication Data
US 2014/0020459 A1    Jan. 23, 2014

Related U.S. Application Data

(60) Provisional application No. 61/433,294, filed on Jan. 17, 2011.

(30) Foreign Application Priority Data

Jan. 13, 2011 (DK) ................. 2011 70017

(51) Int. Cl.
*F03D 11/00*   (2006.01)
*G01D 5/20*    (2006.01)

(52) U.S. Cl.
CPC ............ *F03D 11/0091* (2013.01); *G01D 5/202* (2013.01); *F05B 2260/83* (2013.01);

(Continued)

(58) Field of Classification Search
CPC .................. F05B 2270/327; F05B 2270/809; F05B 2260/83; F05B 2260/84; F05B 2270/1011; F03D 11/0091; G01D 5/202
USPC ........................................ 73/112.01
See application file for complete search history.

(56) References Cited

U.S. PATENT DOCUMENTS 3,682,564 A * 8/1972 Feeney .................. F01D 21/20
                                                415/16
4,217,617 A   8/1980 Rossi et al.
(Continued)

FOREIGN PATENT DOCUMENTS

EP         1918530 A2    5/2008
WO    2011/154318 A2   12/2011

OTHER PUBLICATIONS

Danish Search Report & Written Opinion, PA 2011 70017, Sep. 21, 2011.

(Continued)

*Primary Examiner* — Freddie Kirkland, III
(74) *Attorney, Agent, or Firm* — Patterson + Sheridan, LLP

(57) ABSTRACT

The invention relates to a test tool for testing an overspeed protection system of a wind turbine. The system includes a sensor for sensing a first physical signal having a physical nature and representing a speed of rotation of a rotor of the wind turbine, and for providing a corresponding output signal; means for receiving the output signal from the sensor and for determining, based on the output signal, if the speed of rotation exceeds a threshold of speed of rotation; and means for initiating, if the speed of rotation exceeds the threshold of speed of rotation, an action reducing the speed of rotation. The test tool provides a second physical signal of the same physical nature as the first physical signal, is suitable for supplying the second physical signal to the sensor so as to simulate the rotation of the wind turbine.

20 Claims, 9 Drawing Sheets

(52) U.S. Cl.
CPC ....... *F05B2260/84* (2013.01); *F05B 2270/327* (2013.01); *F05B 2270/809* (2013.01); *Y02E 10/722* (2013.01)

(56) References Cited

U.S. PATENT DOCUMENTS

| | | | | |
|---|---|---|---|---|
| 5,278,773 | A | | 1/1994 | Cousineau |
| 7,561,000 | B2 | * | 7/2009 | Sauter ................ H03K 17/9547 324/655 |
| 2006/0012443 | A1 | * | 1/2006 | Sauter ................ H03K 17/9547 331/23 |
| 2008/0213084 | A1 | * | 9/2008 | Rosenfield ............. F01D 21/02 415/30 |
| 2009/0193894 | A1 | * | 8/2009 | Kabatzke ................ F03D 7/042 73/510 |
| 2009/0295161 | A1 | * | 12/2009 | Steiner ................. F03D 7/0224 290/44 |
| 2013/0082713 | A1 | * | 4/2013 | Bolln ...................... F03D 7/042 324/418 |

OTHER PUBLICATIONS

1500CS Precision Calibrator, Technical brochure, MTI Instruments Inc., Albany, New York, USA published earlier than Nov. 13, 2006 as verified by the Internet Archive, Wayback Machine. See in particular pp. 1 and 3.

International Search Report & Written Opinion, PCT/DK2012/050011, May 16, 2012.

* cited by examiner

TESTING AN OVERSPEED PROTECTION SYSTEM OF A WIND TURBINE

FIELD OF THE INVENTION

The present invention relates to a system and a method for testing an overspeed protection system of a wind turbine.

BACKGROUND OF THE INVENTION

A wind turbine comprises blades attached to a rotor hub for rotation in a rotor plane as well as a control system for pitching the blades relative to the hub. Many modern wind turbines comprise an overspeed protection system in order to protect the wind turbines against mechanical stresses at high winds, viz. at overspeed conditions. An overspeed condition occurs when the speed of a shaft of a wind turbine exceeds a specific range or threshold. During an overspeed condition, a wind turbine may experience severe mechanical stresses that may cause failure of components of the wind turbine. An overspeed protection system protects the wind turbine by initiating an emergency shutdown of the wind turbine during an overspeed event. Such an emergency shutdown may be performed by pitching of the blades of the wind turbine and/or by yawing the wind turbine out of the wind.

Requirements exist in relation to regular testing of the overspeed protection system of the wind turbine. The test is currently performed by operating the wind turbine at rotational speeds in order to observe whether the protection system operates to shut down the wind turbine at the threshold speed. This requires the wind speed to be above at least 6.5 m/s. Typically it would be advantageous if the testing of the overspeed protection system could be performed when one or more service technicians has/have other task to be performed at the wind turbine, such as servicing or maintenance.

However, the probability that the wind speed is below 6.5 m/s on a randomly chosen day is 10%, which means that in roughly 10% of the service technician visits there is not enough wind speed to test the overspeed protection system.

This necessitates extra service technician visits, which is costly and time consuming.

Hence, it would be advantageous to provide a system and a method for testing an overspeed protection system of a wind turbine which is operable independently of the present wind speed.

SUMMARY OF THE INVENTION

Accordingly, it may be seen as an object of the present invention to solve the above mentioned problem with regard testing the overspeed protection system of a wind turbine at low wind speeds. In particular, it may be seen as an object of the present invention to provide a system and a method for testing an overspeed protection system of a wind turbine which is operable independently of the present wind speed.

This object and several other objects are obtained in a first aspect of the invention by providing a test tool for testing an overspeed protection system of a wind turbine, where the overspeed protection system includes a sensor for sensing a first physical signal having a physical nature and representing a speed of rotation of a rotor of the wind turbine, and for providing a corresponding output signal; means for receiving the output signal from the sensor and for determining, based on the output signal, if the speed of rotation exceeds a threshold of speed of rotation; and means for initiating, if the speed of rotation exceeds the threshold of speed of rotation, an action reducing the speed of rotation. The test tool of the invention includes a device capable of providing a second physical signal of the same physical nature as the first physical signal, where the test tool is suitable for supplying the second physical signal to the sensor so as to simulate the rotation of the wind turbine.

The invention is particularly, but not exclusively, advantageous for providing a test tool for testing the overspeed protection system of the wind turbine irrespective of the prevailing wind speed. Moreover, the invention is advantageous for providing a testing of the sensor that sense a signal representing the rotation speed of the wind turbine. Thus, the invention is not limited to testing the electronic system receiving the signals from the sensor, but tests both the sensor and the electronic system. Furthermore, performing the test by letting the wind turbine run to overspeed would cause additional loads on the turbine and the foundation, which is avoided by using the tool for testing the overspeed protecting system.

In one embodiment, the device capable of providing a second physical signal is an electrical coil and wherein the second physical signal is an electromagnetic signal emitted from the electrical coil when an electrical current flows in the electrical coil. Such a physical signal is appropriate for simulating the rotation of the rotor of the wind turbines in that. The test tool may comprise means for providing a flow of electrical current in the form of a battery or a connection to an external power source.

The second physical signal may represent a simulated speed of rotation of the rotor of the wind turbine. Hereby, a direct correspondence between the frequency of the second physical signal and the simulated speed of rotation of the wind turbine rotor is achieved. Moreover, a threshold frequency of the second physical signal corresponds to the threshold of speed of rotation of the rotor of the wind turbine.

Preferably, the test tool comprises means for determining whether the overspeed protection system initiates the action reducing the speed of rotation when the frequency of the second physical signal reaches the frequency corresponding to a predetermined threshold value of speed of rotation of the rotor of the wind turbine. Such determination may be reception of a signal from the overspeed protection unit to initiate the action reducing the speed of rotation, checking a light signal at the overspeed protection unit or establishing the initiation of the pitching of the blades of the wind turbine.

Alternatively or additionally, other characteristics of the second physical signal than the frequency may be used for determining a simulated rotational speed of the rotor, e.g. the amplitude of the second physical signal, an on/off ratio of the second physical signal, and/or the shape of the second physical signal.

According to a second aspect of the invention, a method for testing an overspeed protection system of a wind turbine is provided, where the overspeed protection system includes a sensor for sensing a first physical signal having a physical nature and representing a speed of rotation of the wind turbine, and for providing a corresponding output signal; means for receiving the output signal from the sensor and for determining, based on the output signal, if the speed of rotation exceeds a threshold of speed of rotation; and means for initiating, if the speed of rotation exceeds the threshold of speed of rotation, an action reducing the speed of rotation. The method of the invention includes supplying a second physical signal of the same physical nature as the first physical signal to the sensor so as to simulate the rotation of the wind turbine.

This aspect provides similar advantages as the first aspect, viz. the possibility of testing the overspeed protection system of a wind turbine irrespectively of the prevailing wind speed.

In a preferred embodiment, the method comprises a step of varying the frequency of the second physical signal in order to represent a varying simulated speed of rotation of the rotor of the wind turbine. The step of varying the frequency of the second physical signal may comprise increasing the frequency of the second physical signal to or above a frequency corresponding to a predetermined threshold value of speed of rotation of the rotor of the wind turbine. Furthermore, the method may comprise a step of determining whether the overspeed protection system initiates the action for reducing the speed of rotation when the frequency of the second physical signal reaches the frequency corresponding to a predetermined threshold value of speed of rotation of the rotor of the wind turbine.

For security reasons, the method according to the invention may comprises as a first step the application of a rotor brake and/or a rotor lock. Thereby, it is prevented that the rotor of the wind turbine moves and any service technician present at or within the nacelle is protected from the movement of the rotor of the wind turbine.

These above described and other aspects of the invention will be apparent from and elucidated with reference to the embodiments described hereinafter.

BRIEF DESCRIPTION OF THE FIGURES

The present invention will now be explained, by way of example only, with reference to the accompanying Figures, where.

Similar reference numbers are meant to denote similar elements throughout the figures.

DETAILED DESCRIPTION OF AN EMBODIMENT

Figure 1:
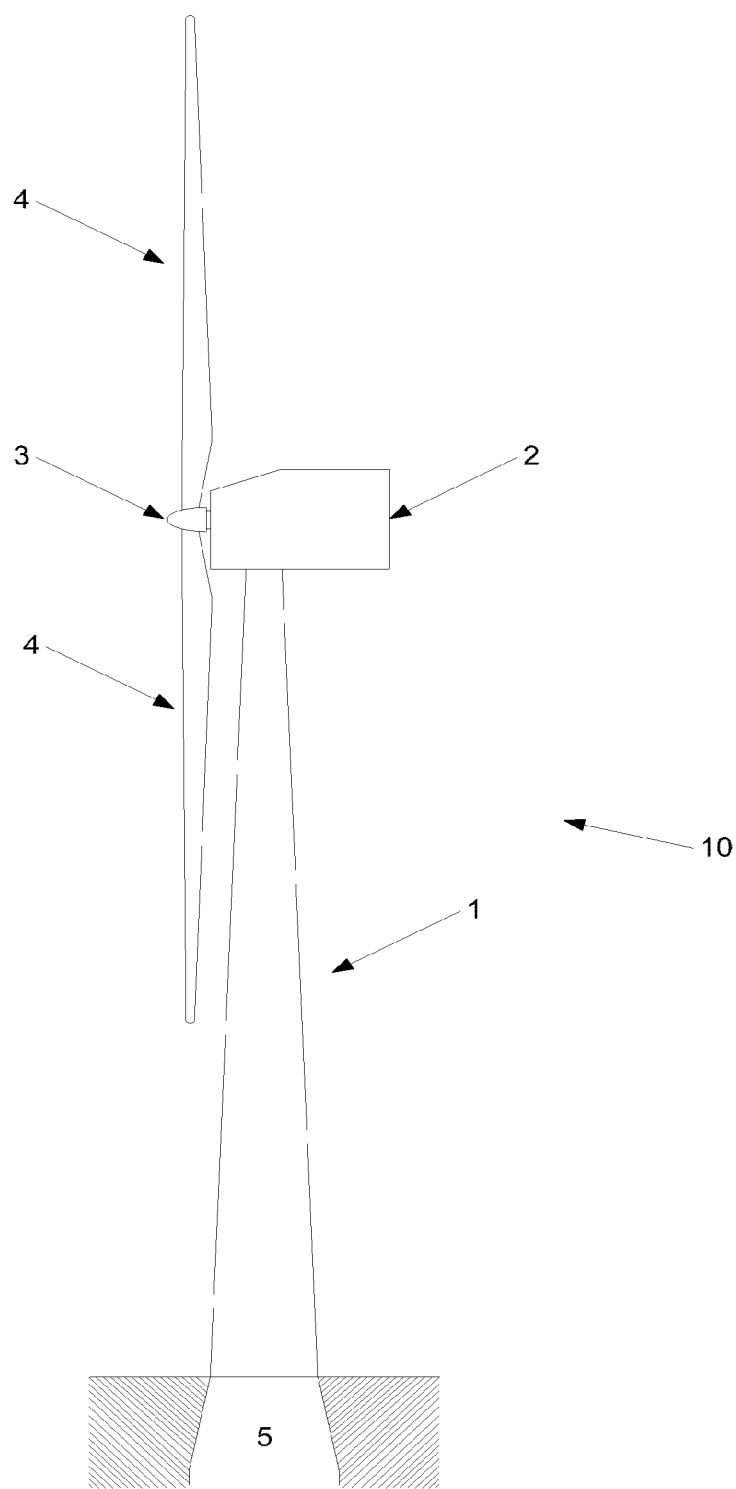
FIG. 1 is a schematic drawing of a wind turbine generator.

FIG. 1 is a schematic drawing of a wind turbine generator 10. The wind turbine generator 100 includes a tower 1 having a number of tower sections (not shown in FIG. 1), a nacelle 2 positioned on top of the tower 1, and a rotor extending from the nacelle 2. The tower 1 is erected on a foundation 5 built in the ground. Alternatively, the foundation 5 might be built on the sea floor in the case where the wind turbine is an offshore wind turbine. The rotor is rotatable with respect to the nacelle 2, and includes a hub 3 and one or more blades 4. The rotor is arranged to be brought into rotation in respect to the nacelle 2 by wind incident on the blades 4. The mechanical energy from the rotation of the rotor is converted into electrical energy by a generator in the nacelle 2. The electrical energy is subsequently converted to a fixed frequency electrical power to be supplied to a power grid. The wind turbine generator 100 may also form part of a wind power plant comprising a plurality of wind turbines generators 10. Although the wind turbine generator 100 shown in FIG. 1 is shown as having two blades 4, it should be noted that a wind turbine generator may have different number of blades; a typical number of blades is three, but it is common to find wind turbines having one to four blades. The wind turbine generator 10 shown in FIG. 1 is a Horizontal Axis Wind turbine (HAWT) as the rotor rotates about a substantially horizontal axis. It should be noted that the rotor may rotate about a vertical axis. Such a wind turbine generator having its rotor rotates about the vertical axis is known as a Vertical Axis Wind Turbine (VAWT). The embodiments described henceforth are not limited to HAWT having two blades. They may be implemented in both HAWT and VAWT, and in wind turbine generators having any appropriate number of blades 4 in the rotor. and in wind turbine generators having any appropriate number of blades 4 in the rotor.

Figure 2:
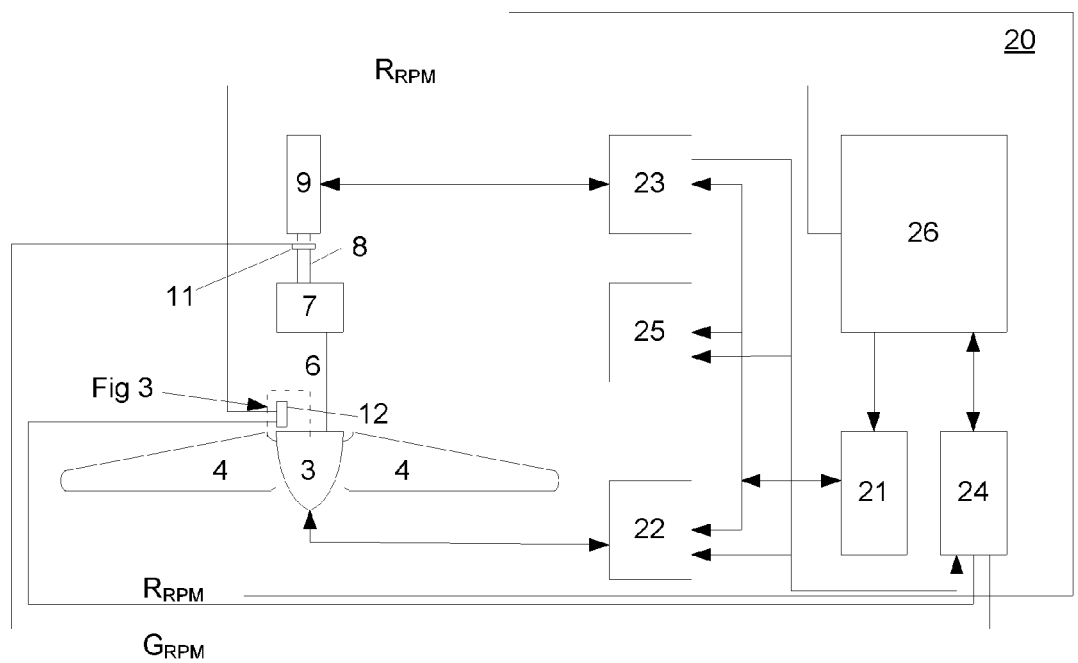
FIG. 2 is a schematic drawing of an overspeed protection system.

FIG. 2 is a schematic drawing of an overspeed protection system 20 of a wind turbine 10. The components of the overspeed protection system 20 shown in FIG. 2 are typically mounted within the nacelle 2 or the tower 1 of the wind turbine 10. FIG. 2 is not shown to scale and the positioning of the components of the overspeed protection system 20 is not necessarily correct, in that FIG. 2 is a schematic drawing giving an overview of the components of the overspeed protection system 20 and some signals between the components. The wind turbine shown in FIG. 2 is a wind turbine with a gear box 7. The hub 3 is connected to a first shaft 6, typically denoted a low-speed shaft, connected also to the gear box. A second shaft 8, typically denoted a high-speed shaft, connects the gear box 7 and the generator 9. The rotation of the high-speed shaft 8 is capable of making a rotor of the generator 9 rotate in order to provide electrical energy from the generator 9.

The overspeed protection system 20 comprises an overspeed protection module 26 in communication with an emergency circuit 21 and a controller 24. The emergency circuit 21 is in communication with a pitch controller 22, a generator connection 23 as well as other systems 25. The controller 24 is also in communication with the pitch controller 22, the generator connection 23 and the other systems 25. The generator connection 23 receives signals from the generator 9, i.a. signals on rotational speed from the rotational sensor of the generator, and the pitch controller is in communication with the hub 3 in that signals from the pitch controller are received by pitch controllers in the hub in order to control the pitching of the blades 4. A shaft speed sensor 11 is mounted at the high-speed shaft 8 in order to sense the rotational speed of the high-speed shaft 8. A signal $G_{RPM}$ containing information on the rotational speed of the high-speed shaft 8 is sent from the sensor 11 to the controller 24. Moreover, an inductive sensor 12 is placed in proximity to the hub 3 in order to detect the rotational speed of the hub 3. A signal $R_{RPM}$ containing information on the rotational speed of the hub 3 is sent from the inductive sensor 12 to the controller 24 as well as to the overspeed protection module 26. The part of the hub 3 facing the shaft 6 and the inductive sensor 12 is a rotor disc 3b (see FIGS. 3a and 3b) having a plurality of locking holes 3c (see FIGS. 3a and 3b). The inductive sensor 12 is capable of sensing the rotational speed of the rotor disc 3b and thus of the hub 3 by sensing the presence or absence of the locking holes 3b and the speed with which locking holes 3b passes by the inductive sensor 12.

When an overspeed condition occurs, e.g. at high wind velocities, the speed of a shaft of a wind turbine may reach a predetermined threshold of speed of rotation. In order to prevent the wind turbine 10 from experiencing severe mechanical stresses that may cause failure of components of the wind turbine 10, the overspeed protection system 20 operates to initiate an action reducing the speed of rotation of the hub 3. Such an initiation of an action reducing the speed of rotation of the hub 3 may be sending from the overspeed protection module 26 a signal to the emergency circuit 21 in order to initiate and communicate the slowing down or stopping of the wind turbine 10. The emergency circuit communicates to the pitching controller 22 to make the pitching controller 22 send signals to the pitch systems within the hub 3 activating pitching of the blades 4 out of the wind. Moreover, the emergency circuit 21 communicates to the generator controller 23 and the other systems 25 that the wind turbine is about to be slowed down and eventually brought to a stop. It should be noted that the components critical to safety are the overspeed protection module 26, the emergency circuit 21, the pitch controller 22 and the generator connection 23 as well as the communication between these components. It should be noted that FIG. 2 is a drawing of a general overspeed protection system. In FIG. 2 a dotted rectangle indicates a part of the FIG. 2 shown enlarged in FIG. 3a.

Figure 3A:
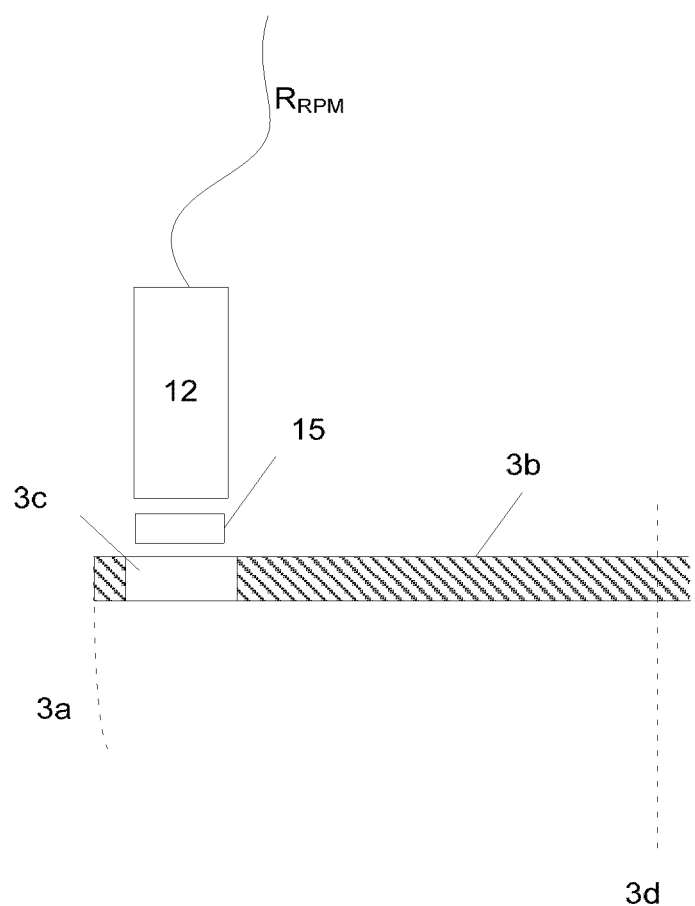
FIG. 3a is a schematic drawing a system according to the invention for testing the overspeed protection system in combination with components of the wind turbine and the overspeed protection system.

FIG. 3a is a schematic drawing of a test tool 15 according to the invention for testing the overspeed protection system in combination with components of the wind turbine and the overspeed protection system. FIG. 3a shows a part of a cross section of the hub 3, the surface of which is indicated by the dotted line 3a.

Figure 3B:
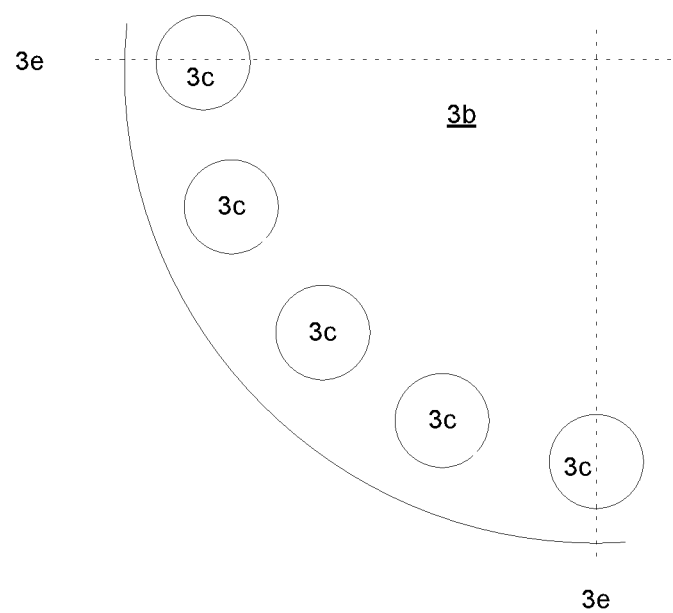
FIG. 3b is a schematic drawing of a rotor disc.

The hub 3 includes or is connected to a rotor disc 3b having locking holes 3c. The rotor disc 3b is metallic or comprises metal. The locking holes 3c are air holes in the rotor disc 3b. This is disclosed in more detail in FIG. 3b which is a schematic drawing of part of a circular rotor disc 3b. Only about a fourth of the rotor disc is shown in FIG. 3b, in that the lines 3e in FIG. 3b are lines of symmetry. Along the circumference of the rotor disc 3b is a plurality of locking holes 3c. Such locking holes may be used to ensure the fixing of the hub when the rotor of the wind turbine 10 has been brought to a stop, which is i.a. necessary for safety reasons during servicing of the wind turbine 10.

Referring again to FIG. 3a, only about half the rotor disc 3b is shown in cross section, in that the line 3d indicates a line of symmetry of the rotor disc 3b. The hub has been locked in a position wherein a locking hole 3c is level with the inductive sensor 12. An inductive sensor is an electronic proximity sensor, which detects metallic objects without touching them. The inductive sensor 12 is capable of sensing a first physical signal having a physical nature, viz. an electromagnetic signal representative of the frequency of the passage of locking holes and thus representing a speed of rotation of a rotor of the wind turbine. The inductive sensor 12 is capable of sensing the rotational speed of the rotor disc 3b and thus of the hub 3 by sensing the presence or absence of the locking holes 3c and the speed and/or frequency with which locking holes 3b passes by the inductive sensor 12. This is due to the fact that the principle of inductive proximity sensors, e.g. digital inductive sensors, is based on the interaction between metallic conductors and an electromagnetic alternating field. Eddy currents are induced in the metallic damping material, in this case the rotor disc 3b, which removes energy from the electromagnetic field. This change is processed in the inductive sensor which changes its output state accordingly. The inductive sensor 12 is arranged for providing an output signal $R_{RPM}$ indicative of the frequency of passage of locking holes 3c and thus of the rotational speed of the hub.

The test tool of the invention includes a device 14 capable of providing a second physical signal of the same physical nature as the first physical signal, and the test tool is suitable for supplying the second physical signal to the sensor so as to simulate the rotation of the wind turbine. Thus, the device 14 may comprise a coil and the second physical signal may be an electromagnetic signal emitted from the coil when an electrical current flows in the coil. However, it should be noted that other appropriate sensors than an inductive sensor 12 may be used and that instead of locking or air holes on the rotor disc, other elements on or of the rotor disc or hub may be used for sensing the speed of rotation of the hub.

In FIG. 3a the test tool 15 is shown as being placed inbetween the inductive sensor 12 and a locking hole 3c of the rotor disc 3b.

However, alternatively the device may be mounted inserted into a locking hole 3c. As a third alternative, the inductive sensor 12 may be demounted and the test tool 15 may be placed in a fixed relationship to the inductive sensor 12. In all three cases, the test tool 15 may advantageously be held in a fixed position, viz. at a predetermined distance from the inductive sensor 12 by means of a holding device. See FIGS. 5a-5c.

Figure 4:
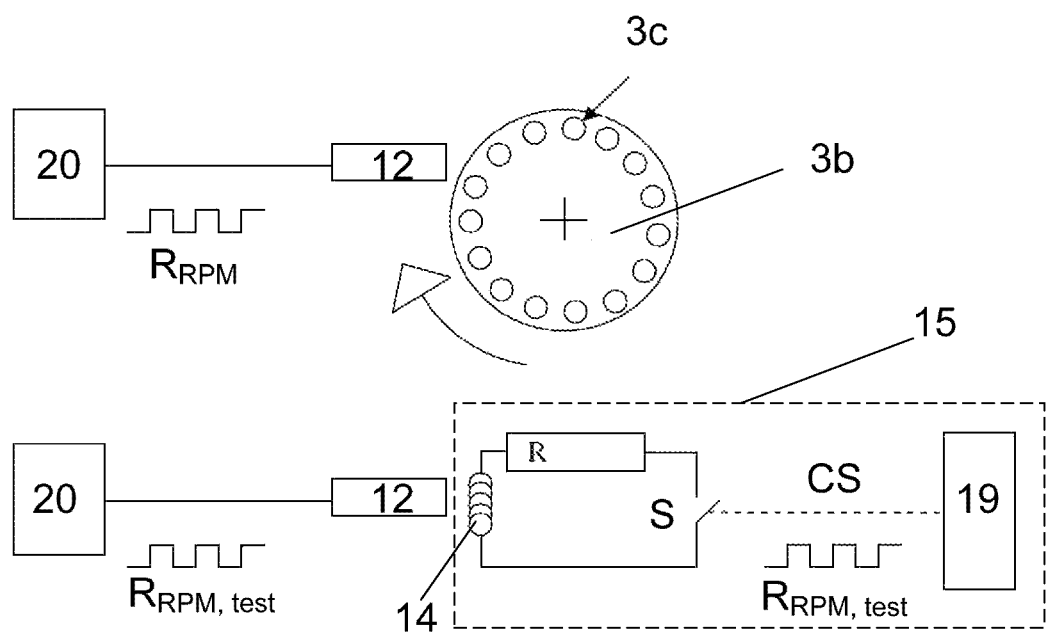
FIG. 4 is a schematic drawing of a normal operating scenario as well as a test scenario.

FIG. 4 is a schematic drawing of a normal operating scenario as well as a test scenario. In the upper part of FIG. 4 is shown a sketch of the normal operating scenario, whilst the lower part of FIG. 4 shows a sketch of the test scenario. In the upper part of FIG. 4, the overspeed protection system 20 is connected to the sensor 12 placed in the proximity of the metallic rotor disc 3b. When the rotor disc is rotated, as shown by the arrow, the interaction between the metallic material of the rotor disc 3b and the air holes 3c provides the output signal $R_{RPM}$ representative of the rotational speed.

In the lower part of FIG. 4, the test scenario is shown, where a test tool 15 according to the invention is placed in the proximity of the sensor 12. Preferably, the rotor disc 3b is locked in the test scenario. The test tool In FIG. 4, the inductive sensor 12 is not placed in proximity to the hub 3 in order to detect the rotational speed of the hub 3, but is placed in proximity to a test tool 15 according to the invention for testing the overspeed protection system. The test tool 15 comprises an electric coil 14 in a loop with a resistor R. The loop may be opened or closed by a switch S, the opening and closing of which is controlled by a test tool controller 19 sending a control signal CS to the switch. When the loop is closed, the coil 14 is energized and energy is removed from the inductive field, which will be sensed by the inductive sensor 12 as a signal being on. In the case of an open loop where the coil 14 does not receive energy, the open electric coil 14 does not remove enough energy from the field which will be sensed by the inductive sensor 12 as the signal being off. The shift between an open and closed loop coil 14 will generate the frequency of an output signal $R_{RPM, test}$ from the inductive sensor 12. The inductive sensor 12 is not able to detect whether the field detected emanates from a rotating metal disc with air or locking holes or from an electrical coil in a loop shifted between open and closed. The shift between air and metal in the case of a rotating disc as well as the similar shift between open and closed loop coil generates the frequency of the output signal from the inductive sensor 12.

It should be noted, that even though the test tool controller 19 and the loop comprising the coil 14, the resistor R and the switch S is shown as a single unit in FIG. 4, this need not be the case. The test tool controller 19 could be one unit connected to the another unit comprising the loop of the coil 14, the resistor R and the switch S. Alternatively, the test tool controller 19 could be a unit including the resistor R and the switch S, whilst the coil 14 would be embedded within the holding plate, where the coil 14 and the unit comprising the test tool controller 19, the resistor and the switch S would be connected via a cable.

Figure 5A:
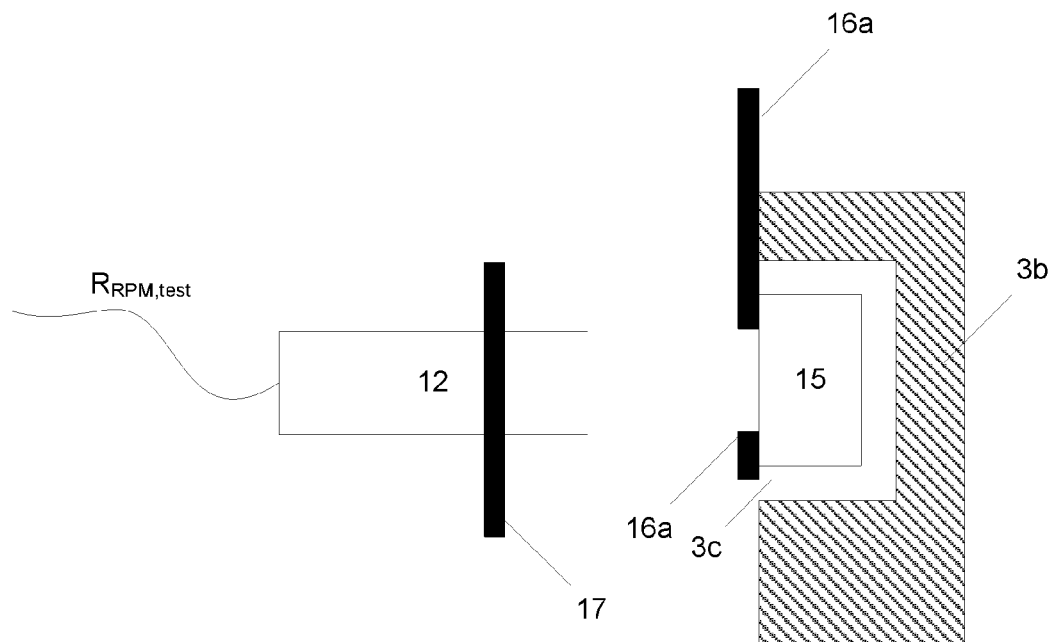
FIGS. 5a, 5b and 5c show the positioning of a test tool according to the invention in relation to the sensor of the overspeed protection system.
Figure 5B:
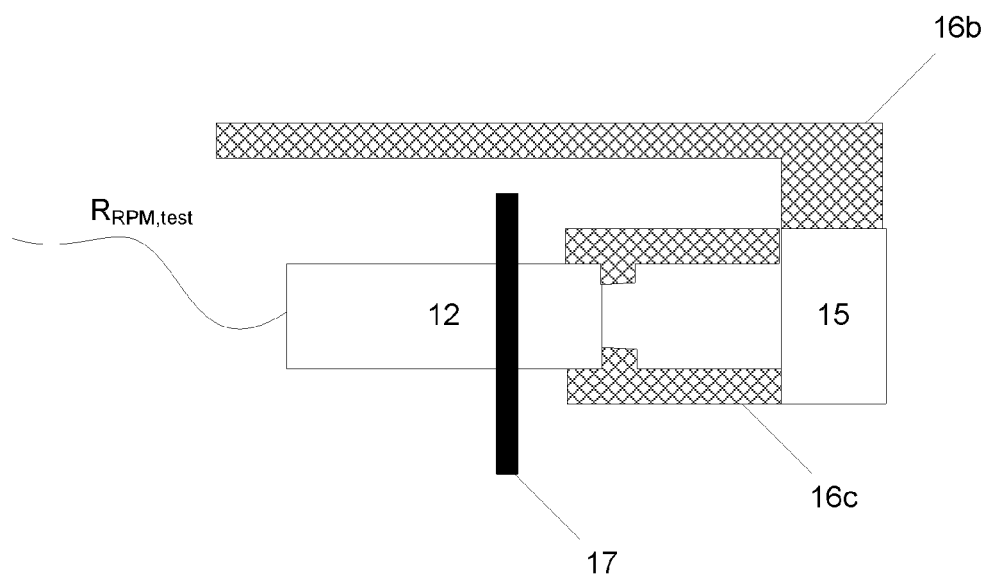
Figure 5C:
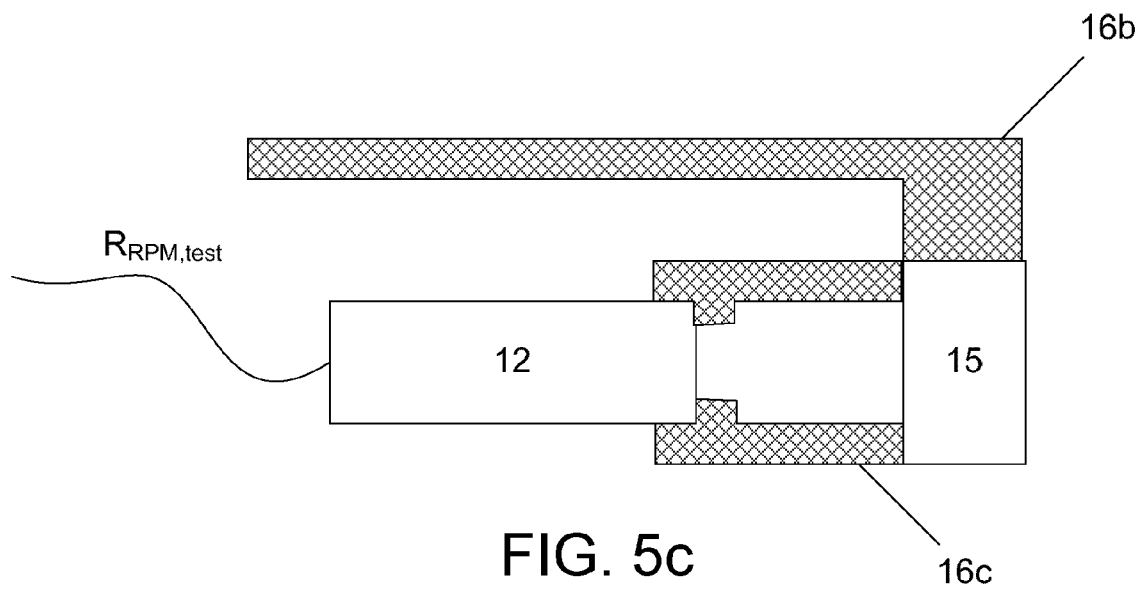

FIGS. 5a, 5b and 5c show the positioning of the test tool 15 according to the invention in relation to the sensor of the overspeed protection system. The system is connected to electrical power, i.e. via wires (not shown in the figures), in order to let current flow through the coil 14 of the test tool 15 (see FIG. 4).

In FIG. 5a the test tool 15 is placed within a locking hole 3c of the rotor disc 3b. The test tool 15 is held fixedly within the locking hole 3c by a holding device 16a, for instance in the form of a magnetic holding device. The inductive sensor 12 of the overspeed protection system capable of providing an output signal $R_{RPM}$ indicative of the rotational speed of the rotor is held stationary by means of a sensor holding device 17. This sensor holding device 17 is a holding device arranged for holding the inductive sensor in a fixed position during the operation of the wind turbine, and is thus not directly related to the testing of the overspeed protection system. In FIG. 5b the test tool 15 is held by means of a holding device having elements 16b and 16c. The element 16c is capable of ensuring a predetermined positioning of the test tool 15 in relation to the inductive sensor 12. The holding device of FIG. 5c comprises elements 16b and 16c corresponding to the elements 16b and 16c of FIG. 5b. In FIG. 5c, however, the inductive sensor 12 has been removed from its position held by the sensor holding device 17 (see FIG. 5b). When the test tool 15 for some reason, e.g. due to spatial restraints, cannot be mounted in a predetermined position in relation to the inductive sensor 12 whilst the inductive sensor 12 is positioned in relation to the wind turbine rotor, the inductive sensor 12 may be released from the sensor holding device 17 (see FIG. 5b) during the testing of the overspeed protection system.

Figure 6:
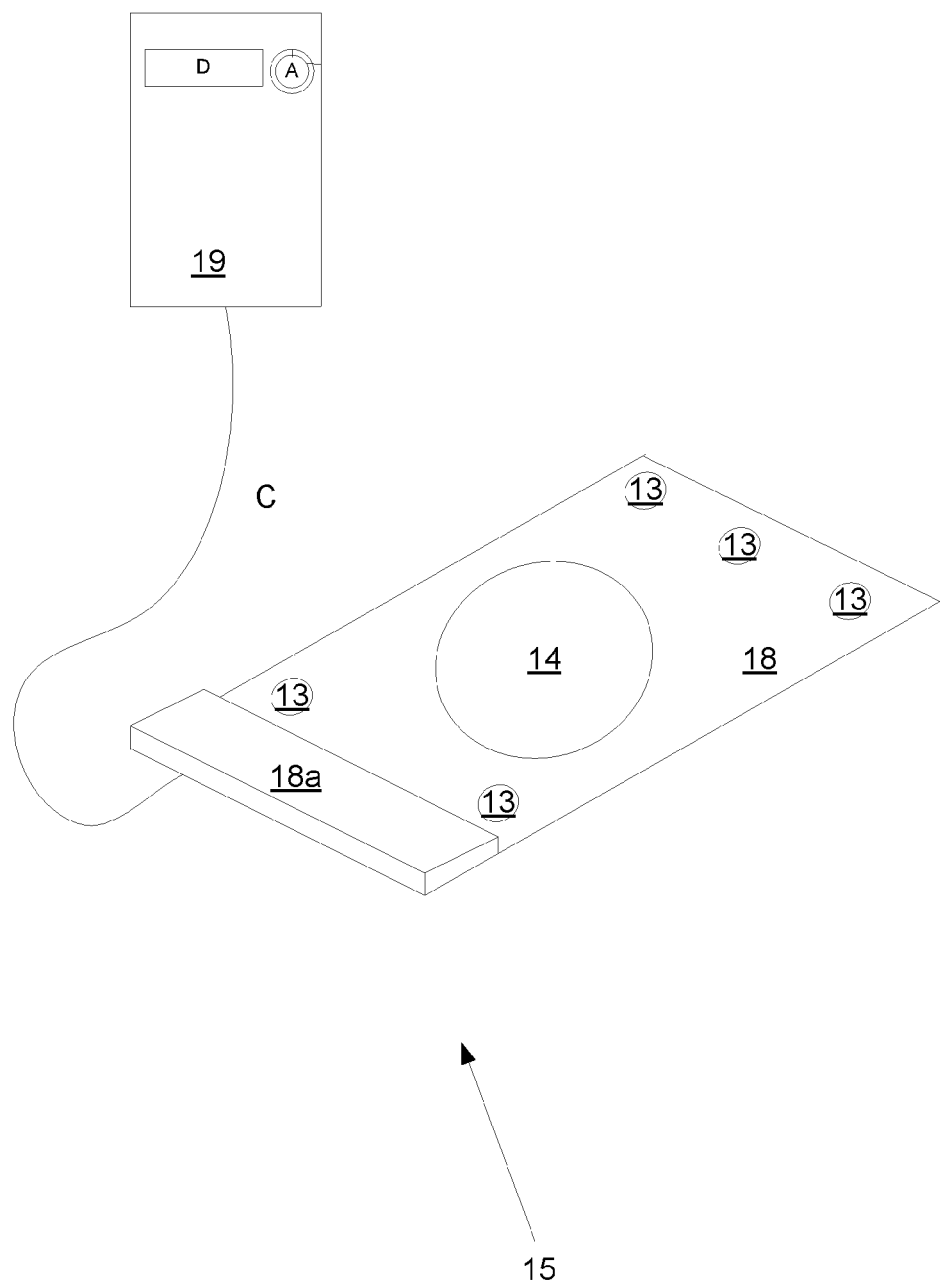
FIG. 6 is a schematic drawing of the electrical coil 14 embedded in a holding plate.

FIG. 6 is a schematic drawing of the electrical coil 14 embedded in a holding plate 18. A plurality of permanent magnets 13 are attached to the holding plate 18. The strength, size, position and number of the permanent magnets 13 are determined in order to allow temporary attachment of the holding plate 18 to the rotor disc of a wind turbine. The holding plate 18 optionally includes a handle 18a for easy mounting/dismounting of the holding plate to/from the rotor disc. The length of the holding plate 18 should be sufficient for the test tool to fit to all appropriate rotor disc sizes. The thickness of the holding plate, including the electrical coil, is preferably between 1 and 10 mm, preferably between 1.5 and 4 mm. In one embodiment the thickness of the holding plate including the electrical coil is about 2 mm. A slim holding plate will allow easy insertion thereof between the sensor 12 and rotor disc of most current wind turbines. The holding plate 18 including the electrical coil 14, and optionally also the switch S and the resistor R, may be sprayed with a protective coating for durability.

A cable C connects the loop containing the electrical coil to the test tool controller 19. The cable C could e.g. be of a length of the magnitude 1-5 metres. The test tool controller 19 preferably comprises a display D and an adjustment means A for adjusting the frequency of the simulated signal.

Figure 7:
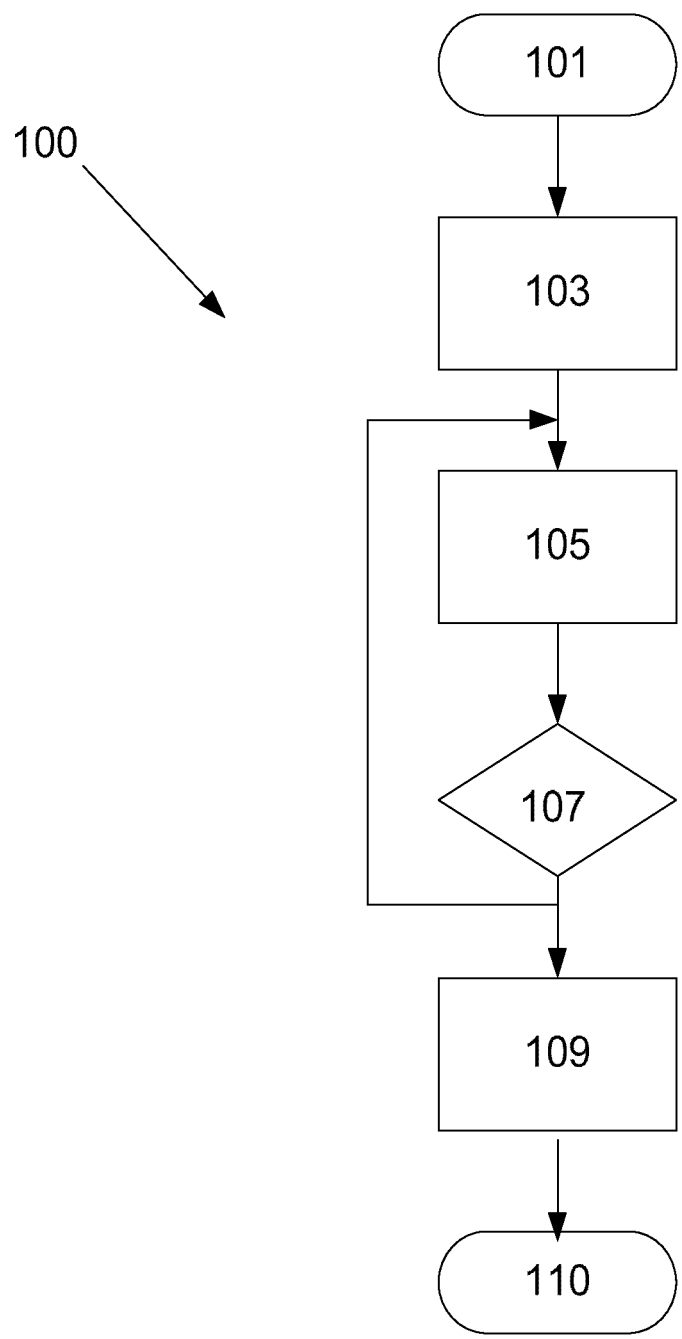
FIG. 7 is a flow-chart of a method according to the invention.

FIG. 7 is a flow-chart of a method 100 according to the invention for testing an overspeed protection system of a wind turbine. The overspeed protection system includes an inductive sensor for sensing a first physical signal having a physical nature and representing a speed of rotation of the wind turbine. The inductive sensor is arranged for providing a corresponding output signal indicative of the speed of rotation of the wind turbine. The overspeed protection system moreover comprises means for receiving the output signal from the sensor and for determining, based on the output signal, if the speed of rotation exceeds a threshold of speed of rotation; and means for initiating, if the speed of rotation exceeds the threshold of speed of rotation, an action reducing the speed of rotation. A system for testing the overspeed protection system of the wind turbine comprises a device for supplying a second physical signal of the same physical nature as the first physical signal to the sensor so as to simulate the rotation of the wind turbine. Such a device may be an electrical coil. Prior to the method, the test tool according to the invention is positioned fixedly in relation to the inductive sensor of the overspeed protection system. If the test tool is to be mounted inside a locking hole of the rotor, it is ensured that the rotor of the wind turbine has been brought to a stop and the rotor has been locked in the stopped position. Alternatively, the inductive sensor of the overspeed protection system may be removed from its position close to the rotor disc and may be positioned in relation to the test tool, even if the wind turbine is not brought to a total stop, e.g. idling.

The method 100 starts at step 101, and proceeds to step 103 wherein a second physical signal of the same physical nature as the first physical signal is supplied to the inductive sensor whereby the rotation of the wind turbine is simulated. The second physical signal may be an alternating electromagnetic signal emitted from the electrical coil of the test tool by alternately making an electrical current flow in the electrical coil and opening the circuit containing the electrical coil (see FIG. 4). The frequency of the alternating electromagnetic signal $R_{PRM,test}$ (see FIG. 4) corresponds to a simulated rotational speed of the wind turbine rotor. In step 105, the frequency of the electromagnetic signal is increased and in step 107 it is determined whether the overspeed protection system has initiates the action for reducing the speed of rotation. If the determination in step 107 indicates that the overspeed protection system has not yet initiated the action for reducing the speed of rotation of the wind turbine rotor, the method reverts to step 105 in order to increase the frequency of the signal so that a higher rotational value of the wind turbine rotor is simulated. If the determination in step 107 indicates that the overspeed protection system has initiated the action for reducing the speed of rotation of the wind turbine rotor, the frequency of the second physical signal, viz. the electromagnetic signal from the electrical coil 14 of the test tool 15 is determined (step 109) and the corresponding value of the simulated speed of rotation of the rotor of the wind turbine is determined, e.g. by calculation or looking up in a table. Hereby, it may be determined whether the overspeed protection system initiated the action for reducing the speed of rotation of the wind turbine rotor at a desired value, and thus whether the overspeed protection system operates satisfactorily. The method ends in step 110.

It should be noted that throughout this specification the terms "rotational speed of the hub" is used synonymously to "rotational speed of the rotor disc", "rotational speed of the rotor", "speed of rotation of the wind turbine" and "rotational speed of the low-speed shaft".

It should be noted that the terms "connect" and "connection" are meant to be understood in their broadest sense so as to denote any relevant connection between the components, e.g. mechanical connections, such as shafts and alignment systems, load applying means, drive means, means for cooling and/or heating, electrical connections, data connections, such as control and/or signal transmission connections, interface connections for heating and/or cooling. Moreover, the term "components being in communication" is meant to denote that signals may be sent from one component to the other and/or vice versa; the sending of the signals may be wired or wireless.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A test tool for testing an overspeed protection system of a wind turbine, the overspeed protection system comprising:
    a sensor for sensing a first physical signal having a physical nature and representing a rotational speed of a rotor of the wind turbine, and further configured to produce a corresponding output signal; and
    an overspeed protection module configured to receive the output signal and to initiate, upon determining the rotational speed exceeds a threshold rotational speed, a predetermined action to reduce the rotational speed;
    the test tool comprising:
        a device configured to produce signals of the same physical nature as the first physical signal; and
        a controller coupled with the device and configured to communicate, after determining the rotor is in a stopped condition, a second physical signal from the device to the sensor that simulates rotation of the rotor of the wind turbine.

2. The test tool according to claim 1, the device comprises an electrical coil, and wherein the second physical signal is an electromagnetic signal emitted by the electrical coil responsive to an electrical current flowing through the electrical coil.

3. The test tool according to claim 2, wherein the controller is further configured to produce the second physical signal with one or more characteristics representing a simulated rotational speed of of the rotor, the one or more characteristics comprising at least one of: an amplitude of the second physical signal, an on/off ratio of the second physical signal, and a shape of the second physical signal.

4. The test tool according to claim 1, wherein the controller is further configured to produce the second physical signal with a frequency representing a simulated rotational speed of the rotor of the wind turbine.

5. The test tool according to claim 4, wherein the simulated rotational speed is at least the threshold rotational speed of the rotor.

6. The test tool according to claim 1, wherein the controller is further configured to determine whether the overspeed protection module initiates the predetermined action responsive to the second physical signal having a frequency corresponding to the threshold rotational speed.

7. The test tool according to claim 1, further configured to couple with a holding device that positions the device at a predetermined distance from the sensor of the overspeed protection system.

8. The test tool according to claim 1, further comprising a holding plate coupled with the device, the holding plate being further coupled with one or more magnets configured to removably attach with a rotor disc of the wind turbine such that the device is positioned to communicate with the sensor.

9. The test tool according to claim 8, wherein a thickness of the holding plate is determined such that the test tool is configured to be removably inserted between the sensor and the rotor disc.

10. The test tool according to claim 9, wherein the thickness of the holding plate is between 1 millimeter (mm) and 10 mm.

11. The test tool according to claim 10, wherein the thickness of the holding plate is between 1.5 mm and 4 mm.

12. A method for testing an overspeed protection system of a wind turbine, the overspeed protection system comprising a sensor configured to sense signals of a first physical nature, the method comprising:
    controlling, using at least one of a rotor brake and a rotor lock of the wind turbine, a rotor of the wind turbine in a stopped condition;
    transmitting, using a test tool communicatively coupled with the sensor, a test signal of the first physical nature that simulates rotation of the rotor; and
    determining whether the overspeed protection system initiates a predetermined action responsive to the test signal having at least one characteristic indicating that a rotational speed of the rotor exceeds a threshold rotational speed.

13. The method according to claim 12, wherein the test tool comprises an electrical coil configured to produce signals of the first physical nature, wherein transmitting the test signal comprises controlling an electrical current through the electrical coil such that the electrical coil emits the test signal.

14. The method according to claim 12, further comprising varying the test signal in order to simulate a varying rotational speed of the rotor.

15. The method according to claim 14, wherein varying the test signal comprises increasing a frequency of the test signal to at least a threshold frequency corresponding to the threshold rotational speed.

16. A test system for testing an overspeed protection system of a wind turbine comprising a rotor, the test system comprising:
    a rotor disc coupled with the rotor and configured to rotate therewith, the rotor disc comprising a surface defining a plurality of openings, the plurality of openings disposed along a circumference of the rotor disc;
    a sensor oriented toward the surface of the rotor disc and configured to sense a first physical signal of a first physical nature, the first physical signal indicating the presence of the plurality of openings, the sensor further configured to produce an output signal indicating a rotational speed of the rotor;
    a test tool configured to produce signals of the first physical nature, at least part of the test tool configured to be removably inserted into one of the plurality of openings, wherein the test tool is further configured to communicate a second physical signal to the sensor that simulates rotation of the rotor.

17. The test system of claim 16, wherein the test tool comprises:
    a device configured to produce signals of the first physical nature; and
    a controller coupled with the device and configured to communicate the second physical signal having at least one characteristic indicating that a rotational speed of the rotor exceeds a threshold rotational speed.

18. The test system of claim 16, further comprising one or more of a rotor brake and a rotor lock configured to maintain the rotor in a stopped condition.

19. The test system of claim 18, wherein the plurality of openings comprise a plurality of locking holes that, when the rotor lock is engaged with at least one of the plurality of locking holes, prevent rotation of the rotor disc.

20. The test system of claim 16, wherein the sensor comprises an inductive sensor.

* * * * *